United States Patent
Brötje et al.

(10) Patent No.: US 7,664,186 B2
(45) Date of Patent: Feb. 16, 2010

(54) CHANNEL DECODING FOR MULTICARRIER SIGNAL TRANSMISSION BY MEANS OF DC-OFFSET AND CARRIER-FREQUENCY OFFSET-DEPENDENT WEIGHTING OF RELIABILITY INFORMATION

(75) Inventors: Lars Brötje, Achim (DE); Karl-Dirk Kammeyer, Buchholz (DE); Volker Kühn, Bremen (DE); Sven Vogeler, Bremen (DE)

(73) Assignee: Infineon Technologies AG, Munich (DE)

( * ) Notice: Subject to any disclaimer, the term of this patent is extended or adjusted under 35 U.S.C. 154(b) by 672 days.

(21) Appl. No.: 10/842,970

(22) Filed: May 11, 2004

(65) Prior Publication Data
US 2004/0228418 A1 Nov. 18, 2004

(30) Foreign Application Priority Data
May 14, 2003 (DE) .................... 103 21 743

(51) Int. Cl.
*H04K 1/10* (2006.01)
(52) U.S. Cl. .............. 375/260; 370/208; 370/329; 370/343; 370/344; 455/522
(58) Field of Classification Search ............ 375/326
See application file for complete search history.

(56) References Cited
U.S. PATENT DOCUMENTS

| | | | |
|---|---|---|---|
| 5,140,699 A * | 8/1992 | Kozak .................... 455/84 |
| 5,442,646 A * | 8/1995 | Chadwick et al. ........ 714/795 |
| 5,732,113 A * | 3/1998 | Schmidl et al. .......... 375/355 |
| 6,504,884 B1 * | 1/2003 | Zvonar .................... 375/346 |
| 6,628,735 B1 * | 9/2003 | Belotserkovsky et al. ... 375/355 |
| 6,901,121 B1 * | 5/2005 | Dubrovin et al. ......... 375/346 |
| 7,120,213 B2 * | 10/2006 | Gatherer et al. .......... 375/347 |
| 7,167,530 B2 * | 1/2007 | Koomullil et al. ........ 375/329 |
| 7,340,013 B2 * | 3/2008 | Ammer et al. ............ 375/340 |
| 2002/0051498 A1 | 5/2002 | Thomas et al. |
| 2003/0031278 A1 * | 2/2003 | Kang et al. ............... 375/341 |

FOREIGN PATENT DOCUMENTS

| DE | 199 35 824 A1 | 2/2001 |
|---|---|---|
| DE | 101 14 779 A1 | 10/2002 |

* cited by examiner

*Primary Examiner*—Shuwang Liu
*Assistant Examiner*—Dhaval Patel
(74) *Attorney, Agent, or Firm*—Eschweiler & Associates, LLC

(57) ABSTRACT

The influence of a DC offset with a carrier-frequency offset at the same time is reduced in that the values of the assumed or determined DC offset and of the assumed or determined carrier-frequency offset are included in the determination of reliability information for one sub-carrier in the multicarrier system, and the reliability information is corrected in this way. A factor M, where M<1, is defined for each sub-carrier on the basis of the values for the DC offset and for the carrier-frequency offset, and the reliability information for the sub-carriers is multiplied by these factors M.

8 Claims, 2 Drawing Sheets

CHANNEL DECODING FOR MULTICARRIER SIGNAL TRANSMISSION BY MEANS OF DC-OFFSET AND CARRIER-FREQUENCY OFFSET-DEPENDENT WEIGHTING OF RELIABILITY INFORMATION

REFERENCE TO RELATED APPLICATIONS

This application claims the benefit of the priority date of German application DE 103 21 743.6, filed on May 14, 2003, the contents of which are herein incorporated by reference in their entirety.

FIELD OF THE INVENTION

The present invention relates to a method for reduction of interference, which is caused by a DC offset with a simultaneous carrier-frequency offset, with received channel-coded data symbols in a multicarrier system with two or more sub-carriers.

BACKGROUND OF THE INVENTION

Within the European DVB (Digital Video Broadcasting) system, digital transmission systems have been developed for satellite (DVB-S), for cable (DVB-C) and for terrestrial digital broadcast radio transmission (DVB-T), and appropriate specifications have been worked out for this purpose. As a result of the problematic transmission conditions which occur on the terrestrial radio channel, the OFDM (Orthogonal Frequency Division Multiplexing) transmission method has been specified as the transmission method in the DVB-T specification, which makes it possible to effectively counter the difficult transmission conditions. A further field of application for the OFDM transmission method is formed by high-rate wire-free data transmission networks (WLAN=Wireless Local Area Network), in particular the Standards IEEE 802.11a and IEEE 802.11g, as well as HYPERLAN/2.

The OFDM transmission method is a multicarrier transmission method, in which the datastream is split between a number of parallel (orthogonal) sub-carriers, which are each modulated with a correspondingly low data rate. As is illustrated in FIG. 1, (sub-)carrier frequencies are arranged at equal intervals from one another within a transmission bandwidth K on the frequency scale. The carrier frequencies are located on both sides of and symmetrically with respect to a mid-frequency fc. One OFDM data symbol is formed from the superimposition of all K carrier frequencies. Since the data is transmitted in the form of data blocks of length Tu, which are separated from one another by guard intervals, the time signals in the sub-carriers are multiplied by a square-wave window function. The multiplication of a time signal by a square-wave window function corresponds to convolution of the spectrum with the Si function (si(x)=sin (x)/x, where x=pfTu). The length of a data block, which corresponds to the length of the window, thus determines the interval between the zero points and the Si function, with this frequency interval corresponding to the inverse of the data block length. If the spectrum as shown in FIG. 1 is convolved with the Si function, then this results in the diagram in FIG. 2. FIG. 2 shows the spectrum before the addition of the separate components of each sub-carrier, with four sub-carrier spectra being illustrated by way of example. The maximum of a sub-carrier in the frequency domain is theoretically located precisely at the zero points of all the other sub-carrier spectra. The amplitudes and phases of the sub-carrier oscillations are thus not corrupted by the adjacent frequencies. The channels are thus orthogonal with respect to one another.

OFDM radio signals can be received and demodulated by means of conventional reception concepts, which are based on the principle of heterodyne reception with subsequent digital quadrature mixing. However, more advanced reception concepts, in which direct-mixing methods are used, are becoming increasingly popular, particularly for reasons relating to lower power consumption and in order to avoid chip-external filters for mirror-image frequency suppression. In the case of direct-mixing receiver concepts (homodyne receivers), the radio signal, which is received via an antenna and is amplified, is split in the front end into an in-phase (I) and a quadrature (Q) path and is mixed directly to baseband in both paths using the output frequency from a local oscillator, with the oscillator frequencies which are supplied to the mixers being shifted through 90° with respect to one another by means of a phase shifter.

However, the occurrence of a direct-current component (DC offset) in direct-mixing receiver structures represents a significant problem, and makes it harder to process the received data, since components can be driven into the saturation range by the DC offset. In the case of orthogonal multicarrier systems, such as OFDM or DMT (Discrete Multi Tone), the addition of a DC offset corresponds in the time domain to the superimposition of an Si function on the spectrum, which corresponds in form and profile to the Si functions of the sub-carriers carrying the data, which maximum occurs at the frequency f=0 Hz. If the sub-carrier in the multicarrier system at the frequency f=0 Hz is not filled with data, this initially has no effects when considered theoretically, since the Si function has zero points at the maxima of all the other sub-carrier frequencies.

However, since a carrier-frequency offset generally also occurs during actual data transmission, this also causes a shift in the transmission spectrum. This means that two effects occur in the event of a DC offset. On the one hand, the maximum of the resultant Si function no longer occurs at the frequency f=0 Hz when the sub-carriers are not filled with data, but at the frequency of the carrier-frequency offset. On the other hand, the shift caused by the carrier-frequency offset results in the zero points of the Si function no longer being located at the sub-carrier frequencies, so that all of the sub-carriers are subject to interference. The individual sub-carriers are in this case interfered with to different extents depending on the profile of the Si function. The greatest interference components occur on the sub-carriers in the vicinity of the maximum of the Si function. In the boundary area, that is to say well away from the maximum of the Si function, the influence of the interference is less, since the amplitude of the superimposed Si function becomes less in these areas. The influence of the DC offset is thus significantly influenced by the amplitude of the DC offset and by the magnitude of the carrier-frequency offset. On the assumption that the amplitude of the DC offset or of the DC interference is constant, it can generally be assumed that the interference will rise as the magnitude of the carrier-frequency offset increases.

Multicarrier systems, in particular OFDM systems, are provided with channel coding for error protection. If a soft input channel decoder is used, the input values to the channel decoder are weighted with reliability information. The value of this reliability information is generally not the same for all of the sub-carriers, and may depend, for example, on the channel states at the sub-carrier frequencies.

German Laid-Open Specification DE 101 14 779 A1 discloses a transmitting and receiving unit which is used in an OFDM multicarrier system. The transmitting and receiving unit is designed such that the interference parameters of an I/Q modulator and of an I/Q demodulator can be detected in an OFDM signal. An OFDM test signal is up-mixed in the transmission path with the carrier frequency from the transmission oscillator to form an RF signal. A frequency interval such as this between the local oscillator and the transmission-end oscillator that corresponds, for example, to a carrier-frequency interval, is chosen in the reception path. The chosen combination of the carrier-frequency interval and of the sub-carriers at the frequency f=0 Hz means that the individual components do not overlap. This means that I/Q components in the transmission path, I/Q components in the reception path, any DC offset in the transmission path and any DC offset in the reception path do not overlap, so that separation is possible in the receiver. It is thus possible to detect and to compensate for the interference components separately from one another with a relatively high degree of complexity, so that DC-compensated signals can be transferred to the channel decoder.

SUMMARY OF THE INVENTION

The object of the invention is thus to provide a method in which the influence of any DC offset on the quality of the channel decoding can be taken into account with a comparatively low degree of implementation complexity.

In the case of a method according to the invention for reduction of interference, which is caused by a DC offset and a carrier-frequency offset at the same time, in received channel-coded data symbols in a multicarrier system with two or more sub-carriers, the reliability information for channel decoding is determined for at least one sub-carrier. Furthermore, input values to a channel decoder are weighted with the reliability information. One idea of the invention is that the reliability information is corrected on the basis of the magnitude of the interference.

This makes it possible to considerably reduce the influence of the DC offset on the channel decoding of the input values and of the received data, so that the channel decoding can be carried out essentially without any errors. The DC offset is already taken into account in the reliability information, so that the DC offset is already included in a weighting of input values by means of the reliability information. Reliability information determined in this way allows a more precise statement to be made as to the probability with which the decoded received data symbol will correspond to the transmitted data symbol.

In this case, in order to carry out the correction, it is in principle not absolutely essential for the DC offset and the carrier-frequency offset to be determined or estimated at that time. In fact, it is sufficient for the carrier-frequency offset to be estimated roughly, or for both values to be known approximately, or for appropriate values to already exist from previous measurements.

It is preferable if the magnitude of the interference is determined on the basis of assumed or determined values for the DC offset and for the carrier-frequency offset.

The correction is advantageously carried out by multiplication of the reliability information by a factor M.

The correction generally comprises the value of the reliability information being reduced, with this value being reduced in particular on the basis of the magnitude of the interference.

It is possible to provide for the reliability information to be corrected only for sub-carriers which are located within a predetermined interval from the maximum of the shifted Si function, that is to say from the frequency of the carrier-frequency offset, and for the sub-carriers outside this interval not to have their reliability information corrected.

The correction can be carried out by multiplication of the reliability information by a factor $M<1$, in which case the factor M is chosen to be smaller the closer the sub-carrier is to the frequency of the carrier-frequency offset.

The method according to the invention may be part of a method for reception and processing of a channel-coded data signal in a multicarrier system with two or more sub-carriers. This method may be a direct-mixing receiving method, in which the method according to the invention can be used particularly advantageously owing to the more severe problems of the DC offset that are known to occur with this method.

DETAILED DESCRIPTION OF THE INVENTION

Figure 1:
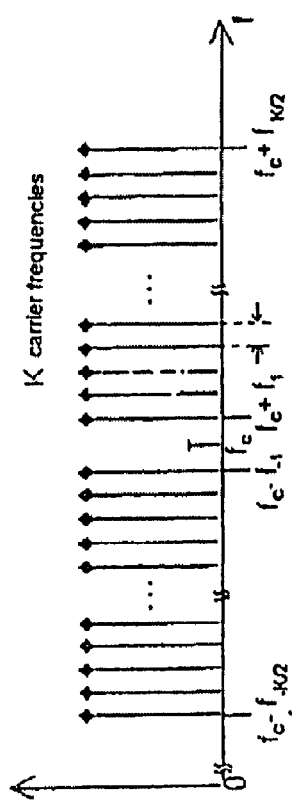
FIG. 1 is a graph illustrating sub-carrier frequencies arranged at equal intervals from one another within a transmission bandwidth K.
Figure 2:
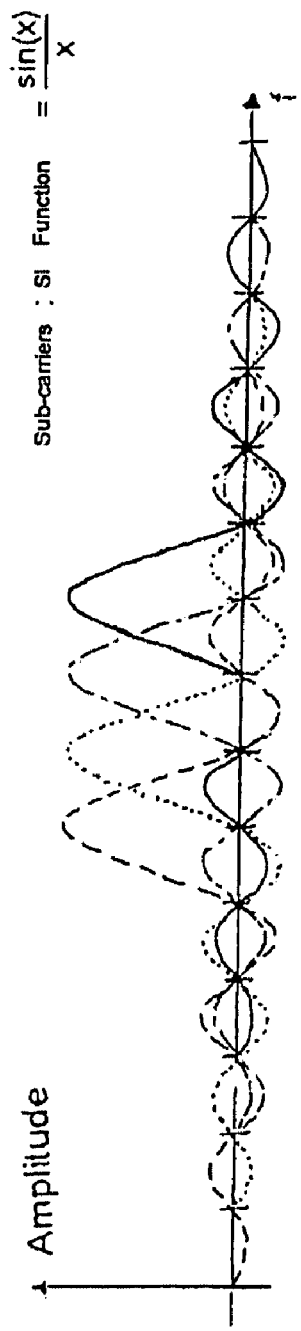
FIG. 2 is a graph illustrating the spectrum of FIG. 1 convolved with the Si function.
Figure 3:
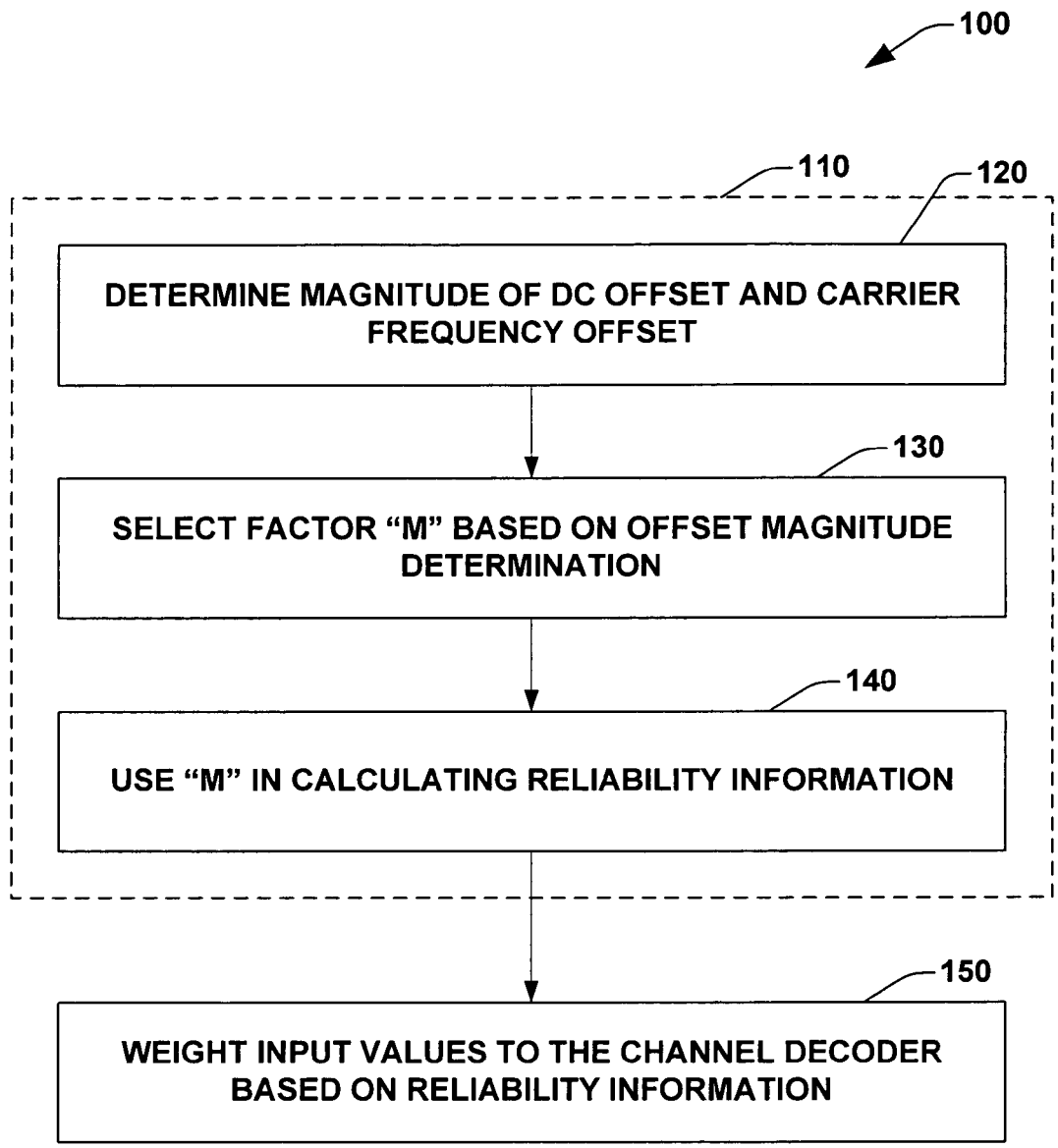
FIG. 3 is a flow chart illustrating a method for reducing interference caused by DC offset and carrier-frequency offset in received channel-coded data according to the present invention.

One exemplary embodiment of the invention will be explained in more detail in the following text in conjunction with the method of FIG. 3.

A multicarrier system that, in the exemplary embodiment, is an OFDM multicarrier system, has two or more sub-carriers. In order to compensate for the influence of the transmission channels on the data transmitted on the sub-carriers, the received data must be equalized at the receiving end. At the transmission end, the data to be transmitted is transmitted in a channel-coded form for error protection, on the basis of the transmission conditions, which vary rapidly.

For reception-end channel decoding, information which indicates the reliability of the transmission on one sub-carrier is desirable and is determined at 110. This reliability information comprises information which has been obtained by a so-called soft decision. In contrast to a so-called hard decision, in which case only one fixed decision threshold is used, a large number of decision thresholds are used for a soft decision, thus considerably increasing the decision confidence.

Equalizers must therefore on the one hand adequately equalize the received signal, and on the other hand must provide the previously described reliability information.

One method for determination of reliability information that is based on this procedure is known from the German Laid-Open Specification DE 199 35 824 A1, which is also available as U.S. Pat. No. 6,782,060 (Hartmann et al.). There, the reliability information for each received symbol is determined by the evaluation of the Trellis state transitions using a specific metric. In this case, both Trellis-based symbols and decision-fed-back symbols are evaluated, with state-independent symbols, which have been decided on previously by means of a hard decision, being used as decision-fed-back symbols.

In the case of multicarrier systems, the value of reliability information will generally not be the same for all the sub-carriers and may, for example, depend on the channel states at the sub-carrier frequencies.

If a datastream is now received via the sub-carriers of the OFDM multicarrier system, the magnitude of any interference DC offset and any carrier-frequency offset is first of all determined or measured 120. A factor M, which is greater than 0 and is less than 1, is selected at 130 via a table for each sub-carrier as a function of these values or on the basis of previously assumed and/or stored magnitudes or values of any DC offset and of any carrier-frequency offset. This factor becomes smaller the greater the specific DC offset and the specific carrier-frequency offset.

In the case of the invention, these factors M are included in the calculation of the reliability information for the sub-carriers at 140. In the exemplary embodiment, the assessment process is carried out in such a way that the factor M, which is selected for each sub-carrier by means of the determined or measured DC offset and the carrier-frequency offset, is multiplied by the magnitude or the value of the reliability information which is generally used for channel decoding and is known from the prior art. The influence of the DC offset with a carrier-frequency offset at the same time is thus taken into account with the reliability information itself, before the actual channel decoding of the received data symbols. Thus, the greater any interference caused by a DC offset with a carrier-frequency offset at the same time on a sub-carrier, the smaller is the factor M, and the smaller is the value calculated from the multiplication of this factor M by the determined reliability information. On the other hand, this reliability information which takes account of the DC offset and of the carrier-frequency offset becomes greater the less the determined DC offset and the carrier-frequency offset, since in this situation the factor M is close to the value 1, and the determined reliability information is reduced only relatively slightly when multiplied by this factor M.

In general, the interference on a sub-carrier caused by a DC offset with a carrier-frequency offset at the same time may be regarded as being large when it occurs in the vicinity of the maximum of the profile (which is characterized by the Si function) of the carrier frequency of a sub-carrier. If the influence of the determined DC offset with a carrier-frequency offset at the same time is taken into account by means of the alternative as explained above of multiplication of the reliability information by a factor M, it is in this case particularly advantageous for the factor M to be larger as the interval from this maximum of the Si function increases. This includes the statements that reduced interference resulting from a DC offset and any carrier-frequency offset allows a more accurate statement to be made about the probability value with regard to the correctness of a channel-coded data symbol. The value of a reliability information associated with a channel-coded data symbol is thus only slightly greater in comparison to the value of the reliability information in which the interference is taken into account and which will be referred to in the following text as extended reliability information. The less the interference from any DC offset with a carrier-frequency offset at the same time, the greater the extent to which the values of the reliability information and the value of the extended or corrected reliability information approach one another, since the factor M always becomes closer to the value 1.

As a rule, the influence of any DC offset and of any carrier-frequency offset is greatest in the vicinity of the maximum of the Si function of the carrier frequency of a sub-carrier. It may therefore be sufficient to correct the reliability information only in the vicinity of the maximum of the Si function of the sub-carrier, or within a predetermined interval from the frequency of the carrier frequency offset of a sub-carrier.

Since, if the amplitude of the DC interference remains essentially constant, the DC offset is governed essentially by the carrier frequency offset, the factor M may also be defined as a function of the determined carrier frequency offset. The influence of the interference resulting from any DC offset is in this case governed essentially only by the carrier-frequency offset when calculating the extended reliability information. Specifically, the greater the carrier-frequency offset, the smaller is the factor M and the smaller is the value of the extended reliability information.

A further advantage of the method according to the invention is that there is no need to estimate the magnitude of the DC offset, in order to reduce the influence of this DC offset on the decoding of received symbols. However, it is also possible to provide for the DC offset to be estimated by means of a suitable estimation method. This estimated value of the DC offset can be included in the calculation of the reliability information or of the corrected or extended reliability information. It is likewise also possible to provide for the value of the carrier-frequency offset to be estimated. However, in principle, it is not a necessary precondition for the correction or reduction of interference caused by any DC offset and any carrier-frequency offset in the method according to the invention for the DC offset to be measured and/or estimated with a carrier-frequency offset at the same time. It is also sufficient for the values of the DC offset and of the carrier-frequency offset just to be known approximately, or for corresponding values to be already known from previous measurements.

Any DC offset with a carrier-frequency offset at the same time may also be corrected by the reliability information for a sub-carrier which is subject to relatively severe interference remaining uncorrected, and for the reliability information for a sub-carrier which is subject to relatively minor interference to be corrected by multiplication by a factor M>1. In this case, the reliability information becomes greater as the magnitude of the interference decreases. In this case, it is possible to provide for the factor M to be chosen to be greater the greater the interval between the sub-carrier and the frequency of the carrier-frequency offset.

In the case of the method according to the invention for reduction of the interference which is caused by a DC offset with a carrier-frequency offset at the same time, corrected reliability information is determined for channel decoding of received data symbols in a multicarrier system in such a way that the interference caused by the DC offset with a carrier-frequency offset at the same time is included or taken into account in the calculation of this corrected reliability information.

A measured or assumed value of the DC offset and of the carrier-frequency offset is characterized for each sub-carrier by a factor M, where M<1, and the interference caused by the occurrence of a DC offset and of a carrier-frequency offset at the same time is taken into account by multiplication of the parameter values, which are used as the basis for the calculation of the reliability information (which is generally known from the prior art), by these factors M. The values of the extended or corrected reliability information are thus reduced as a function of the magnitude of the factors M. Since reliability information indicates probabilities for the extent to which the value of a received data symbol will correspond to the value of the transmitted data symbol, the reduction to a greater or lesser extent of the original reliability information on the basis of the factors M, allows a statement to be made on the magnitude of the influence of the interference, and thus on the lower probability with which the value of the decoded received data symbol will correspond to the value of the transmitted data symbol.

The desired reduction in the influence of the DC offset with a carrier-frequency offset at the same time in a multicarrier system with channel coding can thus be taken into account by the method according to the invention by taking the reliability information that is based on the magnitude of interference (influence of offset) and weighting inputs values to the channel decoder based on the reliability information.

The invention claimed is:

1. A method for processing received channel coded data symbols in an orthogonal frequency division multiplexing (OFDM) system with a plurality of sub-carriers, the received channel coded data symbols being affected by a disturbance caused by a DC offset with a concurrent carrier-frequency offset in the received channel-coded data symbols in a multicarrier system with two or more sub-carriers, comprising:
   determining reliability information for channel decoding for two or more sub-carriers of the plurality of sub-carriers, wherein the reliability information represents a probability with which a channel decoded data symbol corresponds to a transmitted data symbol;
   correcting the reliability information based on a magnitude of the disturbance; and
   weighting input values to a channel decoder with the corrected reliability information,
   wherein the correction is carried out by multiplication of the reliability information by a factor M, wherein M is a function of at least one of the DC offset and carrier-frequency offset, and wherein the factor M is chosen to be a smaller value the closer the sub-carrier is to a frequency of the carrier-frequency offset.

2. The method of claim 1, wherein the magnitude of the disturbance is determined based on assumed or determined values for the DC offset and the carrier-frequency offset, respectively.

3. The method of claim 1, wherein a value of the reliability information is reduced on a basis of the magnitude of the disturbance.

4. The method of claim 1, wherein the correction is carried out by multiplication of the reliability information by a factor $M<1$.

5. A method for reception and for processing of a channel-coded data signal in a multicarrier system having two or more sub-carriers, in which a method according to claim 1 is used in order to process received symbols affected by a disturbance which is caused by a DC offset with a carrier-frequency offset at the same time.

6. The method of claim 5, wherein the reception method comprises a direct-mixing receiving method.

7. The method of claim 1, wherein the reliability information differs for each sub-carrier.

8. A method for processing received channel coded data symbols in an orthogonal frequency division multiplexing (OFDM) system with a plurality of sub-carriers, the received channel coded data symbols being affected by a disturbance caused by a DC offset with a concurrent carrier-frequency offset in the received channel-coded data symbols in a multicarrier system with two or more sub-carriers, comprising:
   determining reliability information for channel decoding for two or more sub-carriers of the plurality of sub-carriers, wherein the reliability information represents a probability with which a channel decoded data symbol corresponds to a transmitted data symbol;
   correcting the reliability information based on a magnitude of the disturbance; and
   weighting input values to a channel decoder with the corrected reliability information,
   wherein the reliability information is corrected only for sub-carriers that are within a predetermined frequency interval from a frequency of the carrier-frequency offset.

* * * * *